United States Patent [19]

Cardot et al.

[11] 4,151,571

[45] Apr. 24, 1979

[54] METHOD OF WRITING ADDRESSES ON A MAGNETIC RECORDING MEDIUM

[75] Inventors: Claude R. Cardot; Jacques P. Droux, both of Paris; André J. Oisel, Elancourt, all of France

[73] Assignee: Compagnie Internationale pour l'Informatique Cii-Honeywell Bull (Societe Anonyme), Paris, France

[21] Appl. No.: 765,058

[22] Filed: Feb. 2, 1977

[30] Foreign Application Priority Data

Mar. 31, 1976 [FR] France .................. 76 09357

[51] Int. Cl.² .................. G11B 21/10; G11B 5/09
[52] U.S. Cl. .................. 360/77; 360/48; 360/49
[58] Field of Search .................. 360/77, 78, 49, 48, 360/44, 50

[56] References Cited

U.S. PATENT DOCUMENTS

| | | | |
|---|---|---|---|
| 2,887,674 | 5/1959 | Greene | 360/44 |
| 3,281,806 | 10/1966 | Lawrance | 360/44 |
| 3,812,533 | 5/1974 | Kimura et al. | 360/78 |
| 3,924,268 | 12/1975 | McIntosh et al. | 360/78 |
| 3,936,876 | 2/1976 | Taylor | 360/78 |
| 3,994,016 | 11/1976 | Moghadam | 360/78 |
| 4,027,338 | 5/1977 | Kril | 360/77 |
| 4,032,915 | 6/1977 | Shanks et al. | 360/44 |

Primary Examiner—Vincent P. Canney
Attorney, Agent, or Firm—Lowe, King, Price & Becker

[57] ABSTRACT

Binary coded address information is written by a magnetic head on a magnetic recording medium, such as a disc, as a plurality of tracks, each having an address associated with it. Each track includes a reference zone containing a plurality of individual cells equal to the number of bits in the address. Each cell represents a binary value and includes two binary state transitions, each of which can occur at one of only two positions. One transition of each cell in each zone occurs at the same position within the cell, with adjacent zones having alternating positions of this transition. The other transition in the cells in each zone occurs at either position to represent the binary values.

18 Claims, 12 Drawing Figures

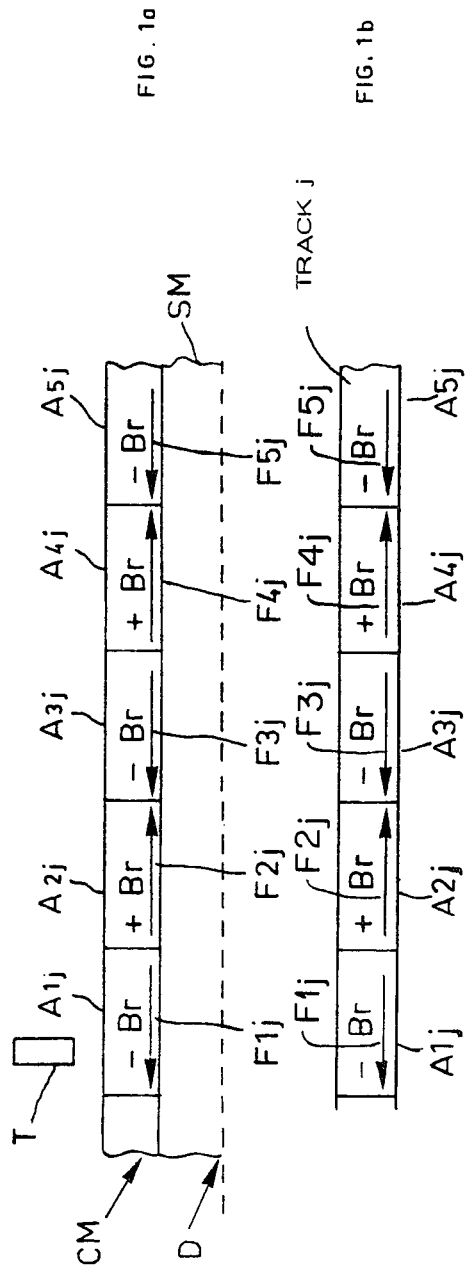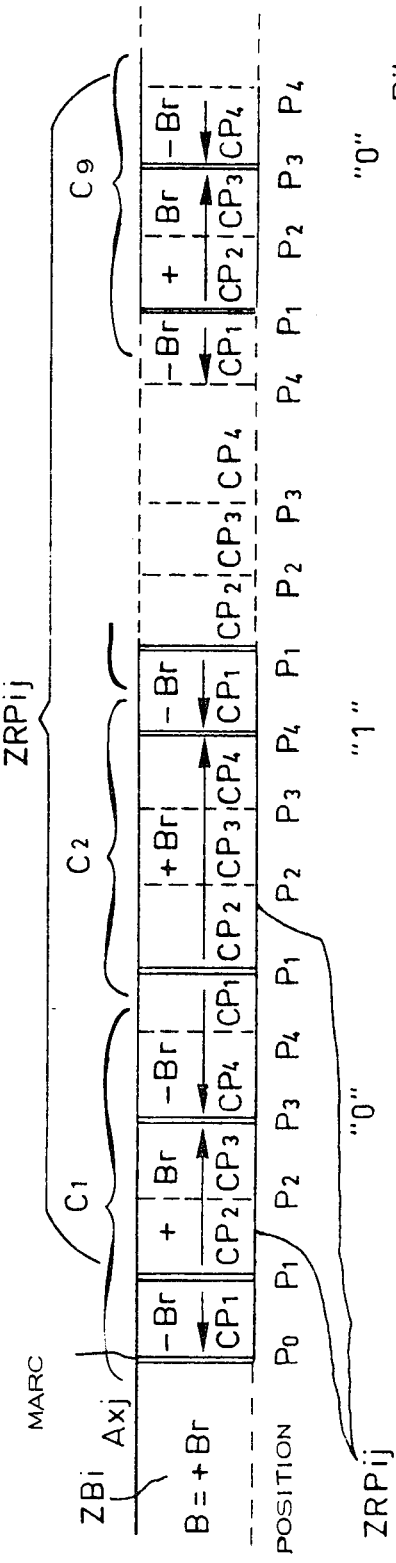

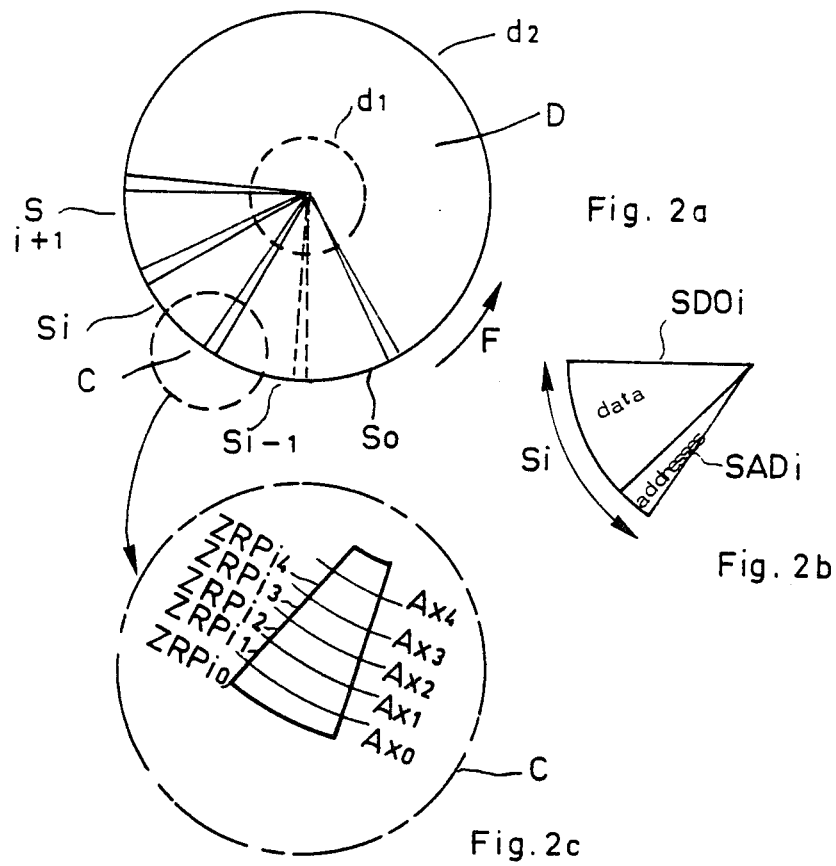
Fig. 2a
Fig. 2b
Fig. 2c
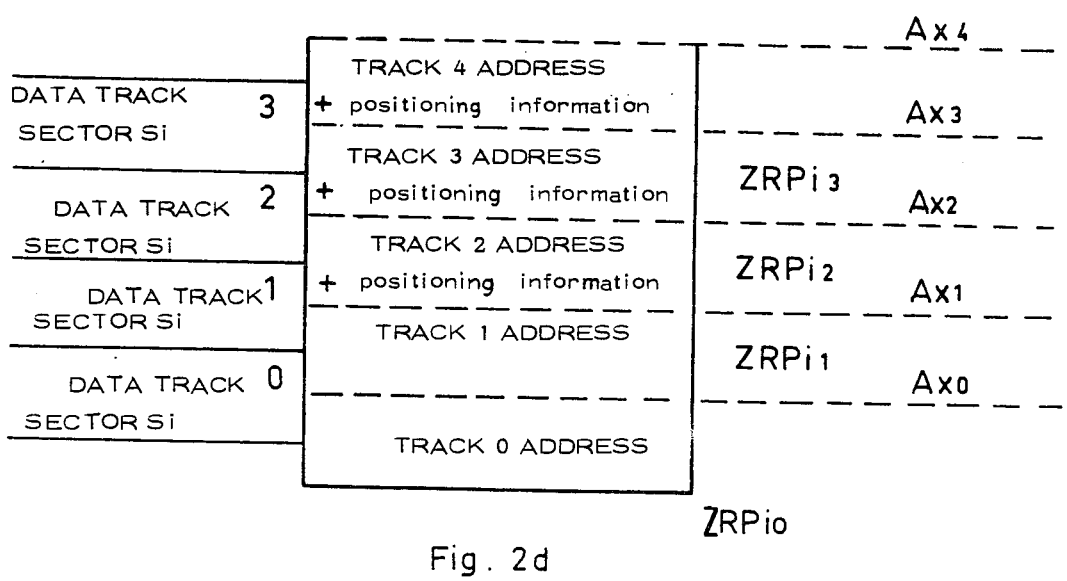
Fig. 2d

METHOD OF WRITING ADDRESSES ON A MAGNETIC RECORDING MEDIUM

BACKGROUND OF THE INVENTION

The present invention relates to a binary recording medium, and more particularly, to a medium wherein each binary bit includes a pair of transitions at predetermined spatial positions.

In present day data-processing systems use is being more frequently made of magnetic disc memories by reason of their storage capacity and of the relatively short time which the magnetic read/write heads take to access information situated anywhere on the discs from the moment when they receive an instruction to access this information from the processing system.

It is known that magnetic discs carry information in coded form on concentric circular recording tracks having a width that does not exceed a few hundredths of a millimeter and which are formed on both faces of the discs. The tracks are identified by allotting them a serial number j (j being a whole number) between 0 and (N-1), N being the total number of recording tracks. A coded expression of a track serial number j is called an address. The codes most frequently used are binary codes.

When memories contain a large number of discs (for very high storage capacity) one face of a single disc is set aside to have recorded on it the addresses of the tracks on all the other faces of the discs, which tracks contain only data intended for processing by the said system.

On the other hand, in memories of smaller storage capacity, which contain only one or two discs, the addresses of the tracks on one face of a disc are recorded on this same face in such a way that a maximum amount of space is set aside for recording data, while a minimum amount of space is set aside for addresses and information required to servo-control the position of a magnetic head to the tracks. In current practice the information for servo-controlling the head position is recorded within a plurality of reference zones, at least equal in number of the number of tracks; the zones are uniformly distributed over the entire surface of the disc. In one type of known system, each reference zone is divided into a number of cells, each of which contains information required to servo-control the position of the heads over the discs.

It is known that to record a series of items of information on a magnetic disc there are created on each track of the disc a succession of small magnetic domains termed "elementary magnetic areas" which are distributed along the entire length of the track and in which the induced magnetism is successively of opposite values and is orientated in a direction parallel to the surface of the disc. In effect, magnetization senses of the areas are opposed. In each cell, the items of information for servo-controlling position are formed by magnetization sense changes which may be in one of two predetermined positions.

These changes in the magnetization sense are repeated identically from one cell to the next in such a way that the magnetization sense of the first elementary magnetic area in each cell is always the same, which makes it necessary for there to be within each cell a second change in the magnetization sense, termed an "adjusting change".

In current practice, these "adjusting changes" always occupy identical positions within each cell and therefore cannot be used as information; this has the disadvantage of requiring space on the magnetic disc that serves no purpose.

SUMMARY OF THE INVENTION

The present invention overcomes this disadvantage by writing addresses on a magnetic recording medium in a simple, economical and reliable method which uses the adjusting changes of code addresses by varying the position of the changes in accordance with the value of each address bit.

Of course, the word "bit" refers to both a binary digit 1 or 0 and to any way of expressing this digit either in the form of magnetic record or in the form of an electric signal.

In accordance with the invention, the address information is written in binary code by magnetic heads in a plurality of tracks of a magnetic recording medium.

The address information includes a sub-group of information items needed for positioning the heads. The items are recorded within sets of reference zones so each track is associated with at least one zone. Each zone contains a plurality of individual cells, each of which contains an information item for positioning the heads. Each zone is defined by a change in magnetization sense and by an adjusting change which allows the magnetization sense of a first elementary magnetic area in any cell always to be the same. The track addresses are written within each zone so the number of individual cells is the same as the number of bits in the address. Each set of zones includes an adjusting region to allow the beginning of the set to be found. The adjusting change in each cell occupies one of two predetermined positions so the value of each address bit is indicated by the position occupied by the adjusting change.

In a preferred embodiment of the invention, the code used to write the addresses is a weighted binary code, known as a Gray code.

BRIEF DESCRIPTION OF THE DRAWING

The invention will now be further described by way of examples with reference to the accompanying drawings, which illustrate one embodiment of the invention, and in which:

FIG. 1 is a simplified diagram showing how information is written on a magnetic disc, wherein FIG. 1a is a section taken through a track, FIG. 1b is a top view of the track;

FIGS. 2a and 2d are illustrations of a preferred method of distributing items of information on the surface of a magnetic disc.

FIG. 3 is an illustrative of the method of writing the addresses of tracks according to the invention; and FIGS. 4, 4a, 5 and 5a are examples of methods of writing two addresses in Gray code according to the invention.

DESCRIPTION OF THE PREFERRED EMBODIMENT

Figure 4:
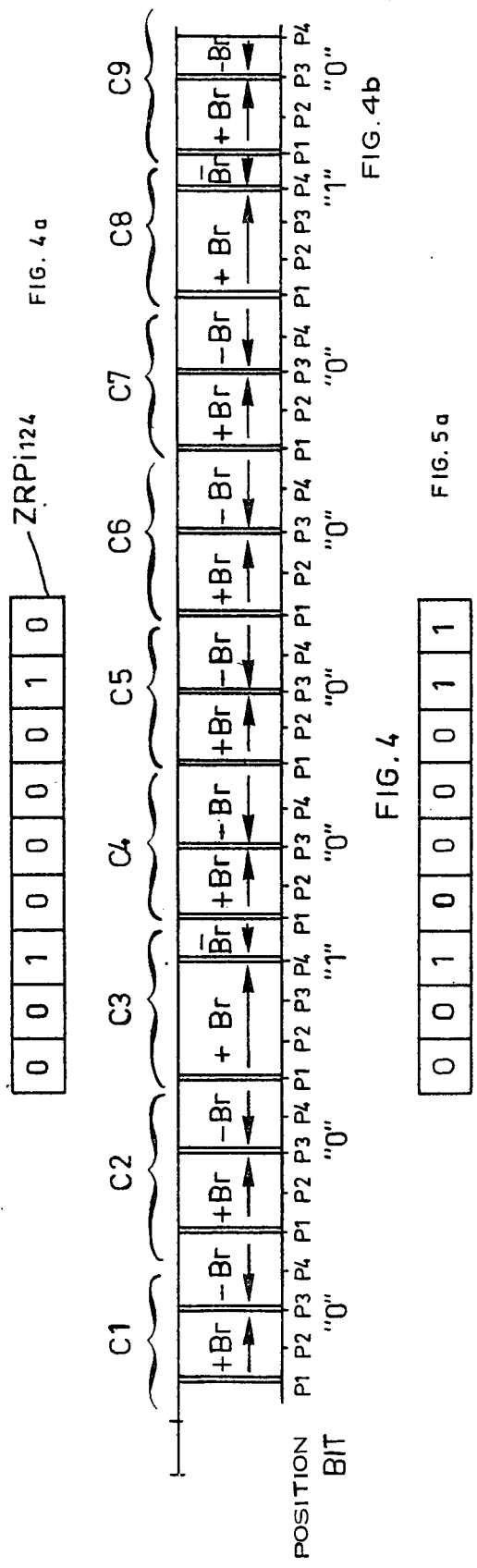

To provide a better understanding of how addresses are written on a magnetic recording medium in accordance with the invention, it may be useful to review a few facts with the aid of FIGS. 1a, 1b and 2a to 2d which show on the one hand how information is written on the surface of a magnetic disc, and on the other hand a preferred manner of distributing the information on the disc. In FIGS. 1a and 1b are shown a portion of a magnetic disc D of a magnetic disc memory. To simplify FIGS. 1a and 1b, the track j is shown as a rectangle. The magnetic disc D includes of a non-magnetic metal base SM to which is applied a thin layer of magnetic material CM.

It is to be recalled that to a magnetic material is magnetized by first subjecting it to a magnetic field generated by a magnetic read/write head; the field intensity is sufficiently great to saturate the material, that is is sufficiently great for the induced magnetism in the material to reach a limiting value Bs as soon as the strength H of the magnetic field reaches a certain value Hs. The magnetic field is then shut off. Within the material, there then remains a non-zero induced magnetism, termed a residual flux density, having a level Br dependent on the magnetic material used.

To write information on each track of serial number j on the disc D, a plurality of elementary magnetic areas A1j, A2j, A3j, A4j, A5j, etc, are created by a magnetic read/write head T.

The axes of magnetisation F1j to F5j which define the direction and sense of the induced magnetism in the elementary magnetic areas A1j to A5j are parallel to the base SM and are successively of opposite sense. Thus the sense of axis F1j is opposite to the sense of axis F2j, the sense of axis F2j is opposite to that of axis F3j, and so on. The level of the induced magnetism within the magnetic areas is equal to (+Br) or (−Br). Thus, if the level of induced magnetism in magnetic area A1j is (−Br), the level of induced magnetism in magnetic area A2j is (+Br) and so on. The length of the elementary magnetic areas may vary.

In FIG. 2a is illustrated a magnetic disc D, which rotates in the direction of arrow F and whose useful recording area is bounded by concentric circles d1 and d2. On this disc are defined n equal sectors of a circle So . . . Si . . . Sn. As is more clearly seen in FIG. 2b, each sector Si is divided into two parts SDOi and SADi, in which are recorded, respectively, the data intended for processing by the data processing system of which the memory is a part and the information needed to servo-control the position of the magnetic head T with respect to the axis Axj of the tracks. The area of part SADi is very much smaller than the area of SDOi.

FIGS. 2c and 2d show in greater detail how the SADi parts of the sectors Si are made up. The figures are enlarged views of the SADi part of sector Si which is contained within circle C, FIG. 2a. Each SADi part of a sector Si is divided into N zones ZRPio . . . ZRPij . . . ZRPiN, N being the number of magnetic tracks on the disc D. In FIGS. 2c and 2d only the first five zones ZRPio to ZRPi4 are shown for simplicity.

The boundaries between the various zones ZRPij are the circular axes Axj of the magnetic tracks. Each magnetic track of serial number j and axis Axj has a zone ZRPij associated with it. Thus, track O has zone ZRPio associated with it, track 1 has zone ZRPi1 associated with it, and so on. The zones ZRPij are termed positioning reference zones.

To simplify FIG. 2d, the zones ZRPij are shown as rectangles. In accordance with the invention, each zone ZRPij also contains the address of the track with which it is associated. As can be seen in FIG. 2d, zone ZRPio contains the address of track 0, zone ZRPi1 contains the address of track 1 and so on.

The addresses of the tracks are expressed in a binary code in which the number k of bits is a function of the number N of recording tracks on the magnetic disc D. Thus, if the number N of recording tracks is 400, for example, the binary code will be a nine-bit one (given that $2^9 = 512$, which is more than 400). $2^k$ is always greater than N. A description of some binary codes is given, for example, on page 277 of "Electronic & Nucleonic Dictionary", 3rd edition, 1966, McGraw-Hill, or page 517 of "Digital Computer and Control Engineering", Ledley, 1960, McGraw-Hill.

In FIG. 3 is shown how a positioning reference zone is constituted in a preferred embodiment of the invention. As in FIG. 2d, positioning reference zone ZRPij is shown rectangular in shape for clarity. Zone ZRPij comprises a plurality of individual cells equal in number to the number of bits needed to write the track addresses; in the embodiment being described, nine cells C1 to C9 are provided for 400 address tracks. One of each of cells C1–C9 corresponds to one address bit, so cell C1 is associated with the most significant address bit and cell C9 is associated with the least significant address bit. The cells are shown in ascending numerical order from left to right, which corresponds to the temporal order in which the cells are written into and read from disc D by magnetic head T.

Each of cells C1 to C9 is of the same length and is divided into four equal parts CP1, CP2, CP3, CP4, having boundaries at positions P1, P2, P3, P4; position P1 is the boundary between parts CP1 and CP2, and so on. In FIG. 3, the level of induced magnetism is shown in each of the parts CP1 to CP4 of cells C1, C2 . . . C9. Each cell contains two successive changes in the sense of magnetization of the layer of magnetic material. The transitions denoting these changes are indicated by double lines in FIG. 3.

Each of the changes may occupy two positions.

The "first change" is an item of information needed to servo-control the position of the head T and indicates the parity of the address. The "first change" may occupy either position P1 or position P2. In FIG. 3, the "first changes" all occupy the P1 position in cells C1 to C9, whereby track j, associated with zone ZRPij is even.

The "second change" may occupy either position P3 or position P4, and indicates the value of the address bit for the cell. If the cell bit is a zero, the "second change" is at position P3; a 1 is indicated by a change at position P4.

The "second change" in the sense of magnetization of the layer of the magnetic material is also termed an "adjusting change". The "second change" makes it possible for each individual cell to be restored to a condition which is identical from one cell to the next so that the value of induced magnetism in part CP1 of each of cells C1 to C9 is the same, −Br in the zone ZRPij illustrated in FIG. 3. In FIG. 3, since the "adjusting change" in both of cells C1 and C9 occupies position P3, the address bits of these cells are 0's; since the "adjusting change" in cell C2 occupies position P4, the corresponding bit is a 1.

Each reference zone ZPRij in a sector Si is preceded by a zone ZBi in which the induced magnetism is constant (being equal to +Br in the embodiment being described). This zone ZBi, termed the blank zone, is thus situated between part SDOi-1 of sector Si-1 and reference zone ZRPij. Consequently, the first cell C1 in a zone ZRPij contains an additional magnetization sense change, MARC, which occupies position PO; the induced magnetism at MARC changing from a value B = +Br to a value B = −Br, as can be seen in FIG. 3. In conclusion, it can be seen that zone ZRPij contains a set of nine cells, each of which comprises three elementary magnetic areas which define two changes in the sense of magnetization of the layer. The length of these areas varies as a function of the address bits.

Figure 5:
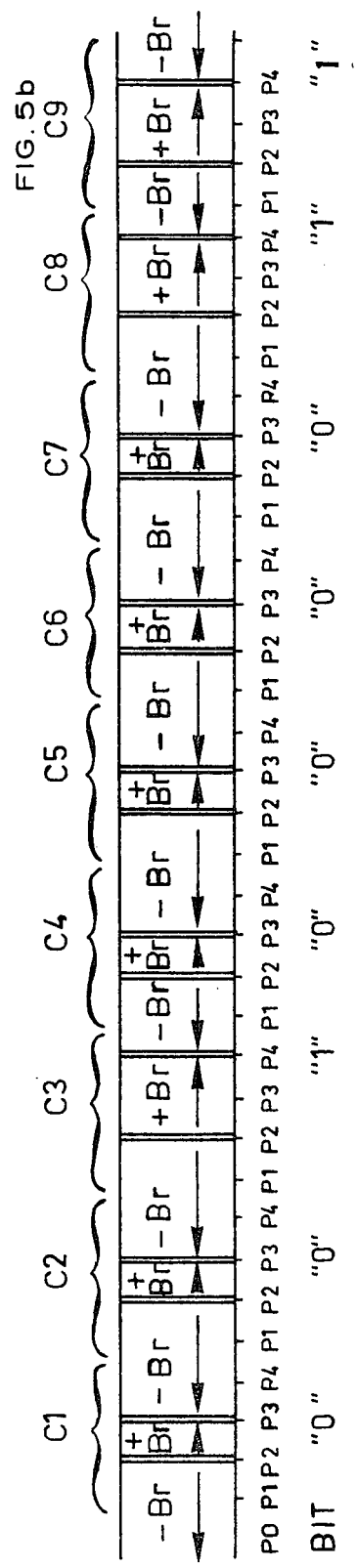

In a preferred embodiment of the invention, the addresses of the tracks are written in a reflected binary code known as a Gray code. Descriptions of this code are given in, for example, the two previously mentioned books. An example of two addresses, namely those of tracks 124 and 125, written in Gray code, is shown in FIGS. 4 and 5. FIGS. 4a and 5a show the numbers 124 and 125 expressed in binary form and FIGS. 4b and 5b show them written on the magnetic disc in zones ZRPi124 and ZRPi125.

As can be seen in FIG. 4b, because track address 124, represented by 001000010, is even, the "first changes" in the magnetization sense occupy the P1 positions in each of the individual cells C1 to C9. The various "adjusting changes" that represent 001000010 occupy the P3 positions in cells C1, C2, C4, C5, C6, C7 and C9, and the P4 position in cells C3 and C8.

Similarly, in FIG. 5b, since the track address 125, represented by 001000011, is odd, the "first changes" occupy the P2 positions in cells C1 to C9 and the various adjusting changes that represent 001000011 occupy the P3 positions in cells C1, C2, C4, C5, C6, C7 and the P4 position in cells C3, C8 and C9.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. A magnetic recording medium for address information to position a magnetic head and data, comprising a plurality of binary coded tracks, a sub-group of information items needed to position the head, the information items being recorded in sets of reference zones, each track being associated with at least one zone, each of said zones containing a plurality of individual cells, each of said cells containing an item of head-positioning information defined by a first change in magnetization polarity sense followed by a second change in magnetization polarity sense, the magnetization sense of a first elementary magnetic area in all cells of each zone always being of the same polarity, the magnetization sense of the first elementary magnetic area of different zones susceptible of being different, the first elementary magnetic area of each cell preceding the first magnetization sense change of the cell, the track addresses being written within each zone, the number of individual cells in each zone being the same as the number of bits in the address, each set of zones including an indexing magnetic region to allow the beginning of the set to be found, one of the magnetization sense changes in each cell occupying one of only two predetermined positions in each cell, the value of each address bit being indicated by the position occupied by the one magnetization sense change in each cell.

2. The medium of claim 1 wherein the binary code is a weighted binary, Gray code.

3. The medium of claim 1 wherein the recording medium is a magnetic disc of a disc memory associated with a data processing system.

4. The medium of claim 1 wherein each set includes a single reference zone, the reference zones being located within equal, separate sectors of a circle which are regularly distributed over the surface of the magnetic recording medium, the number of reference zones being equal to the number of sectors.

5. The medium of claim 4 wherein the indexing region is formed by a change in the magnetization sense situated at the beginning of the first cell in each zone, each reference zone being preceded by a blank zone in which the induced magnetism is constant.

6. A method of recording binary coded information on at least one track of a recording medium comprising recording bilevel physical flux states at spaced positions along the track in response to the value of a binary bit and desired position for a readout head for the track, said flux states spatially alternating between the two levels, three adjacent regions of said alternating flux states forming a cell representing a binary bit value and the desired head position, a predetermined plurality of said cells together forming a binary word, always recording the flux state at the beginning of each cell with the same bilevel value, controlling the position of a first transition between a first pair of adjacent regions of each cell in response to the desired head position, and controlling the position of a second transition between a second pair of adjacent regions of each cell in response to the binary value associated with the cell.

7. A recording medium comprising at least one track containing multiple binary coded information words, each of said words including a predetermined plurality of series cells, adjacent ones of said cells being in abutting relationship along the length of the track, each of said cells representing a binary value and including four parts along the track, adjacent ones of the parts being in abutting relationship along the track length whereby equi-spaced first, second, third and fourth boundaries exist between adjacent parts, each cell including a first transistion in a binary state of a recorded physical property at only one of the first and second boundaries, each cell including a second transition in a binary state of the recorded physical property at only one of the third and fourth boundaries, one of the transitions in each cell being at the same boundary for all cells of a particular word, the other transition in each cell being at either of its possible boundaries to indicate a value associated with the bit.

8. The medium of claim 7 wherein the medium is magnetic and the recorded physical property is a magnetic flux polarity.

9. The medium of claim 7 further including an indexing region having a change in value of the recorded physical property preceding and in abutting relationship with the first cell of each word.

10. The medium of claim 9 wherein the medium is magnetic and the recorded physical property is a magnetic flux polarity.

11. The medium of claim 7 wherein adjacent words have the one transition at opposite cells.

12. The medium of claim 11 wherein the medium is magnetic and the recorded physical property is a magnetic flux polarity.

13. The medium of claim 7 wherein adjacent words represent adjacent numerical values recorded in weighted binary Gray code so there is a change in the least significant value of each bit of adjacent words.

14. The medium of claim 13 wherein adjacent words have the one transition at opposite cells.

15. The medium of claim 14 wherein the medium is magnetic and the recorded physical property is a magnetic flux polarity.

16. The medium of claim 7 wherein the one transition of each cell of each word is preceded by the same binary state of the recorded physical property.

17. The medium of claim 16 wherein adjacent words have the one transition at opposite cells.

18. The medium of claim 17 wherein the medium is magnetic and the recorded phiscal property is a magnetic flux polarity.

* * * * *